United States Patent [19]

Inoue et al.

[11] 4,393,293
[45] Jul. 12, 1983

[54] RESISTANCE WELDING MACHINE

[75] Inventors: Nobuyoshi Inoue; Tomomi Kishi, both of Toyotashi, Japan

[73] Assignee: Toyota Jidosha Kabushiki Kaisha, Toyota, Japan

[21] Appl. No.: 257,171

[22] Filed: Apr. 24, 1981

[30] Foreign Application Priority Data

May 13, 1980 [JP] Japan .......................... 55-064460[U]

[51] Int. Cl.³ ............................................. B23K 11/10
[52] U.S. Cl. ...................................... 219/90; 384/276
[58] Field of Search ........................ 308/237 R, 237 A; 219/78.01, 90

[56] References Cited

U.S. PATENT DOCUMENTS

| | | | |
|---|---|---|---|
| 460,232 | 9/1891 | Hoen | 308/237 R |
| 1,339,084 | 5/1920 | Worrall | 308/237 A |
| 1,600,961 | 9/1926 | Payne | 308/237 R |
| 1,807,166 | 5/1931 | Myers | 208/237 R X |
| 2,539,782 | 1/1951 | Vitzl | 308/237 R |
| 3,285,680 | 11/1966 | Dailey | 308/237 R |

FOREIGN PATENT DOCUMENTS 5445386 12/1979 Japan .

*Primary Examiner*—Elliot A. Goldberg
*Attorney, Agent, or Firm*—Kenyon & Kenyon

[57] ABSTRACT

The resistance welding machine of this invention has an arm carrying a movable electrode and provided with a supporting bore, a power receiving bushing fitted in the supporting bore, and a power feeding shaft mounted on the main body of the welding machine on which a second electrode, is also mounted. The power feeding shaft is received by the bore of the power receiving bush to support the arm while supplying electric power to the movable electrode. A plurality of grooves are formed in the inner peripheral surface of the power receiving bushing to receive powders generated as a result of local wear due to sliding contact between the power feeding shaft and the power receiving bushing. The grooves are filled with grease which adsorbs and holds the powders.

5 Claims, 6 Drawing Figures

U.S. Patent  Jul. 12, 1983  4,393,293
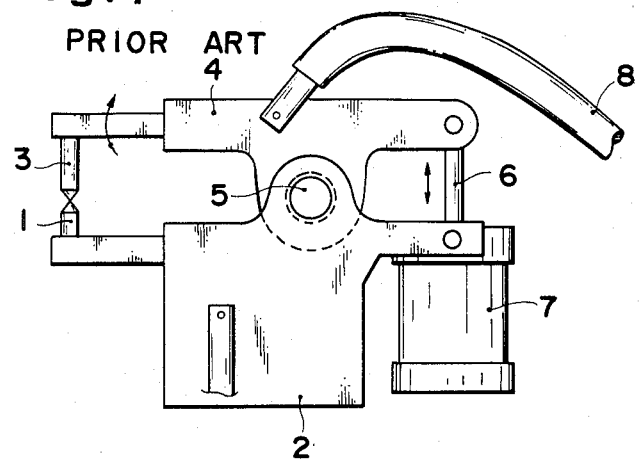
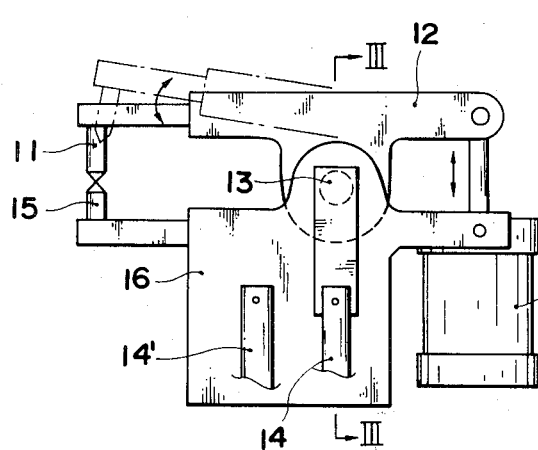
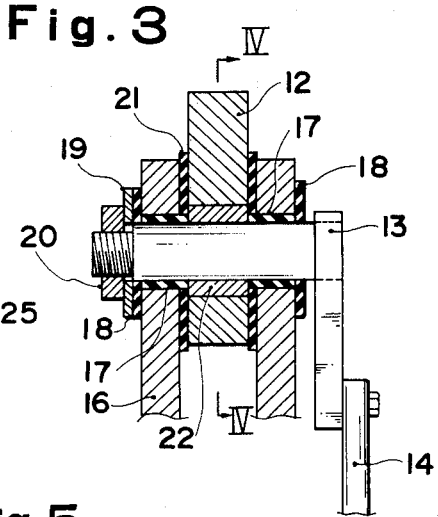
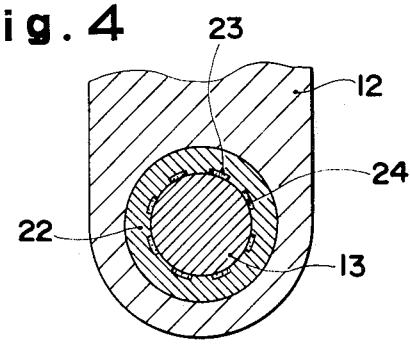
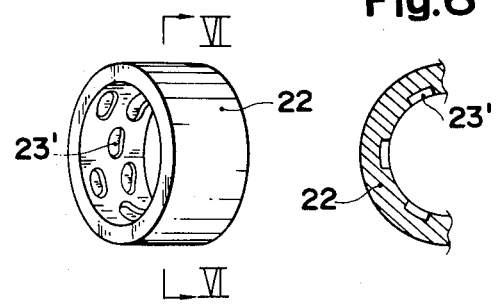
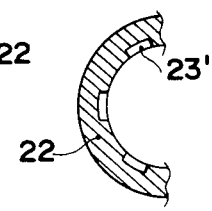

RESISTANCE WELDING MACHINE

BACKGROUND OF THE INVENTION

1. Field of the Invention

The present invention relates to a resistance welding machine and, more particularly, a resistance welding machine which is improved to avoid any damage caused by powders generated by a local wear of power feeding shaft which supports an arm.

2. Description of the Prior Art

Generally, in the resistance welder of arm gun type shown in FIG. 1, an arm 4 provided with an upper electrode 3 is rockably mounted through a shaft 5 on a main body 2 provided with a lower electrode 1. A pneumatic cylinder 7 is connected to the rear end of the arm 4 through a rod 6. The arrangement is such that the lower electrode 1 and the upper electrode 1 are moved toward and away from each other as the pneumatic cylinder 7 operates, thereby to clamp a work therebetween to effect the resistance welding.

The conventional means for supplying the upper electrode 1 with the electric power includes a flexible power feeding cable 8 connected to the arm 4. The flexible power feeding cable 8 is subjected to a repetitional bending force resulting in a shorter life.

In order to overcome this problem, it has been proposed to use the shaft 5 carrying the arm 4 as a power feeding shaft. More specifically, the power feeding cable is connected to the power feeding shaft which in turn is received by a bore of a power receiving bush fixed to the arm 4 so that the electric power is supplied to the arm 4 through a supporting structure for the latter including the power feeding shaft. In the known device of the type stated above, the whole part of the inner peripheral surface of the power receiving bush is finished at a high precision and the power feeding shaft is inserted into the bore of the bush such that it makes a sliding contact over the entire inner peripheral surface of the bush with a small clearance therebetween.

In consequence, when the arm 4 is rocked to press the upper electrode 3 against the work, a local wear is caused by a frictional engagement between the lower surface of the power feeding shaft and the inner peripheral surface of the bush. Unfortunately, due to the close fitting of the power feeding shaft to the bore of the bush, the powders generated as a result of the local wear cannot be released and are inconveniently accumulated in the small gap between the power feeding shaft and the bush. In consequence, is generated by the electric current which flows from the power feeding shaft to the power receiving bush to fuse and weld the powders to the power feeding section to damage the power feeding shaft and the power receiving bush during the rocking of the arm to increase the electric resistance against the current flowing from the power feeding shaft to the power receiving bush.

SUMMARY OF THE INVENTION

Accordingly, an object of the invention is to provide a resistance welding machine having means for adsorbing or absorbing the powders generated by the wear, in view of the above-described problem of the welding of powders generated between the power feeding shaft and the power receiving bush, thereby to overcome the drawback of the prior art.

To this end, according to the invention, a groove is formed in the surface of the power feeding shaft or in the inner peripheral surface of the power receiving shaft, so that the powders generated as a result of a local wear in the sliding parts of the shaft and bush when the arm is rocked to press the contact against the work are conveniently discharged into this groove. The powders are then adsorbed by grease in the groove, so that the undesirable welding of the powders in the sliding parts between the power feeding shaft and the power receiving shaft is completely avoided.

BRIEF DESCRIPTION OF THE DRAWINGS

FIG. 1 is a front elevational view of a conventional resistance welding machine;

FIG. 2 is a front elevational view of a resistance welding machine in accordance with the present invention;

FIG. 3 is a sectional view taken along the line III—III of FIG. 2;

FIG. 4 is a sectional view taken along the line IV—IV of FIG. 3;

FIG. 5 is a perspective view of a power receiving bush incorporated in a welding machine of another embodiment; and FIG. 6 is a sectional view taken along the line VI—VI of FIG. 5.

DESCRIPTION OF THE PREFERRED EMBODIMENTS

Hereinafter, preferred embodiments of the invention will be described with reference to the accompanying drawings, particularly to FIGS. 2 to 6.

Referring first to FIG. 2 showing the whole part of a resistance welding machine in accordance with a first embodiment of the invention, an arm 12 provided with an upper electrode 11 is supported by means of a power feeding shaft 13. As shown in FIG. 3, a plus-side power supply cable 14 is connected to the power feeding shaft 13. A lower electrode 15 is mounted on a main body 16 to which connected is a minus-side power supply cable 14'.

As will be seen from FIGS. 3 and 4 which are sectional views taken along the lines III—III and the lines IV—IV of FIG. 2, the supporting structure for the arm 12 includes an insulator bush 17 through which the power feeding shaft 13 is fitted to the main body 16. At the same time, insulator washers 18 are made to contact both sides of the main body 16. The end portion of the power feeding shaft 13 is fixed by means of a nut 20 through the medium of a metal washer 19.

The arm 12 contacts at its each side with the main body 16 through an insulator washer 21. The power feeding shaft 13 carrying the arm 12 is supported by a conductive bush 22 fitted to the central portion.

A plurality of grooves 23 are formed in the inner peripheral surface of the power receiving bush 22. As will be seen from FIG. 4, these grooves 23 are formed at a predetermined circumferential pitch to extend linearly in the axial direction of the bush. Alternatively, these grooves are formed in a spline-like form in the axial direction of the bush. Anyway, the grooves 23 are filled with grease for lubrication and adsorption of powders generated as a result of local wear in the sliding yarts.

For effecting a welding with this resistance welding machine, the arm 12 is rotated by the pneumatic cylinder 25 so that the work is clamped between the upper electrode 11 and the lower electrode 15. At the same time, the electric power is supplied to the power feeding shaft 13 through a power supply cable 14 so that the electric current flows from the power feeding shaft 13 to the power receiving bush 22. The electric current then flows through the arm 12, upper electrode 11, work, lower electrode, main body 16 and then to the power supply cable 14'.

In the sliding parts between the power feeding shaft 13 and the power receiving bush 22, a local wear is caused due to a rocking motion of the arm 12. Particularly, since the lower surface of the power feeding shaft 13 makes a pressure contact with the power receiving bush 22 as a result of the operation of the air cylinder 25, local wears are liable to be caused in both of the power feeding shaft 13 and the power receiving bush 22.

According to the invention, the powders generated as a result of the local wear are conveniently received by the grooves as the power receiving bush 22 and the power feeding shaft 13 make a rotation relatively to each other. The powders are then adsorbed by the grease 24 filling the grooves 23 so that they are never brought again into the sliding area moving over the edges of the groove 23.

Consequently, the undesirable welding of the powders due to the electric current in the sliding parts is completely avoided to ensure the smoothness of the sliding surfaces on the power feeding shaft 13 and the power receiving bush 22, resulting in a smooth arm operation with reduced electric resistance against the electric current flowing between the shaft and the bush.

FIGS. 5 and 6 show another embodiment in which, as denoted by a reference numeral 23', the grooves have independent circular form and are dispersed in a manner like islands in the inner peripheral surface of the power receiving bush 22. In order to obtain a lower electric resistance, the inner peripheral surface of the power receiving bush 22 may be coated with a material having a good conductivity such as silver.

As has been described, according to the invention, there is provided a resistance welding machine having an arm supporting an upper electrode, a power receiving bush fitted in a supporting bore of the arm, and a power feeding shaft inserted into the bore of the power receiving bush, the power feeding shaft being fixed to the main body of the welding machine having a lower electrode, wherein the improvement comprises a plurality of grooves formed in the inner peripheral surface of the power receiving bush. Therefore, the powders generated as a result of the local wear in the sliding contact areas between the power feeding shaft and the power receiving shaft are conveniently discharged into the grooves in the inner peripheral surface of the power receiving bush so that the welding of the powders is avoided to eliminate any damaging of the power feeding shaft and/or the power receiving bush to prevent any increase of the electric resistance against the electric current in the sliding part.

In addition, since the grooves in the power receiving bush are fillted with grease, the powders generated as a result of the rocking of the arm are conveniently adsorbed by the grease so that they do not come again into the sliding parts between the power feeding shaft and the power receiving groove.

What is claimed is:

1. A resistance welding machine comprising: a first electrode; a second electrode pivotally movable toward and away from the first electrode to engage work therebetween to supply electric resistance welding current to the work; a main body supporting the first electrode; an electrically conductive arm pivotally supported on the main body and supporting the second electrode and making electrical contact therewith to conduct the welding current; a conductive shaft extending through the body; power conductor means rigidly connected to the shaft, said shaft being non-rotably held in the body; conductive bushing means inserted in the arm and making good electrical contact therewith to conduct the welding current, said bushing means being rotatably mounted on the shaft and comprising an inner surface defined by regions of cylindrical curvature closely conforming to the surface of the shaft rotatably supporting the bushing means to make good electrical contact therewith to permit the welding current to flow therethrough and to furnish rotational mechanical support for the arm around the shaft, the inner surface of the bushing comprising a plurality of recesses spaced therearound to receive powdered material generated by rotational rubbing of the inner surface of the bushing on the shaft and lubricant to entrap the powdered material in the recesses; and hollow cylindrical and annular radial insulating means surrounding the shaft axially outward of the bushing and between the shaft and the main body to electrically insulate the shaft, the arm, and the power conductor means from the main body.

2. A resistance welding machine as claimed in claim 1, wherein said recesses have a spiral form.

3. A resistance welding machine as claimed in claim 1, wherein said recesses are independent holes.

4. A resistance welding machine as claimed in claim 1, wherein the inner surface of said bushing is coated with a material having a good electric conductivity.

5. A resistance welding machine as claimed in claim 1, wherein said recesses extend axially along the respective sliding surface.

* * * * *

UNITED STATES PATENT AND TRADEMARK OFFICE
CERTIFICATE OF CORRECTION

PATENT NO. : 4,393,293
DATED : July 12, 1983
INVENTOR(S) : Nobuyoshi Inoue, et al.

It is certified that error appears in the above—identified patent and that said Letters Patent is hereby corrected as shown below:

Change the name of the Assignee from "Toyota Jidosha Kabushiki Kaisha" to

--Toyota Jidosha Kogyo Kabushiki Kaisha--.

Signed and Sealed this

Twenty-eighth Day of February 1984

[SEAL]

Attest:

GERALD J. MOSSINGHOFF

Attesting Officer  Commissioner of Patents and Trademarks